(12) United States Patent
Shigeta

(10) Patent No.: US 11,943,518 B2
(45) Date of Patent: Mar. 26, 2024

(54) IMAGE PROCESSING APPARATUS, IMAGING APPARATUS, AND IMAGE PROCESSING METHOD

(71) Applicant: CANON KABUSHIKI KAISHA, Tokyo (JP)

(72) Inventor: Kazuyuki Shigeta, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 128 days.

(21) Appl. No.: 17/195,754

(22) Filed: Mar. 9, 2021

(65) Prior Publication Data

US 2021/0289149 A1   Sep. 16, 2021

(30) Foreign Application Priority Data

Mar. 10, 2020   (JP) .................................. 2020-040819

(51) Int. Cl.
*H04N 23/11* (2023.01)
*H04N 25/131* (2023.01)

(52) U.S. Cl.
CPC ........... *H04N 23/11* (2023.01); *H04N 25/131* (2023.01)

(58) Field of Classification Search
CPC .......................... H04N 5/332; H04N 19/04553
USPC ......................................................... 348/164
See application file for complete search history.

(56) References Cited

U.S. PATENT DOCUMENTS

| | | | | |
|---|---|---|---|---|
| 7,162,056 B2* | 1/2007 | Burl | ...................... | G05D 1/0246 |
| | | | | 701/28 |
| 9,906,766 B2 | 2/2018 | Takahashi et al. | | |
| 2004/0076324 A1* | 4/2004 | Burl | ........................ | G06T 7/246 |
| | | | | 382/153 |
| 2008/0111894 A1* | 5/2008 | Tanimoto | ............. | H04N 23/843 |
| | | | | 348/222.1 |
| 2011/0169984 A1* | 7/2011 | Noguchi | ................ | H04N 5/332 |
| | | | | 348/E9.053 |
| 2011/0279698 A1 | 11/2011 | Yoshikawa | | |

(Continued)

FOREIGN PATENT DOCUMENTS

| | | |
|---|---|---|
| CN | 102165762 A | 8/2011 |
| CN | 107170768 A | 9/2017 |

(Continued)

OTHER PUBLICATIONS

Office Action dated Aug. 30, 2023, in corresponding Chinese Patent Application No. 202110259106.3, with English translation (22 pages).

*Primary Examiner* — Joseph G Ustaris
*Assistant Examiner* — Jimmy S Lee
(74) *Attorney, Agent, or Firm* — Venable LLP

(57) ABSTRACT

An image processing apparatus includes at least one processor operatively coupled to at least one memory that function as an input unit configured to receive an image signal of a visible light pixel and an image signal of a near-infrared pixel, output from a sensor that includes a visible light pixel component and a near-infrared pixel component, a determination unit configured to determine whether or not an output signal of the near-infrared pixel is higher than a threshold and to produce a determination result, a detector configured to detect a saturated visible light pixel, and a switching unit configured to switch over saturation processing to be applied to the saturated visible light pixel on the basis of the determination result of the determination unit.

17 Claims, 11 Drawing Sheets

(56) References Cited

U.S. PATENT DOCUMENTS

| | | | |
|---|---|---|---|
| 2011/0310014 A1 | 12/2011 | Mizuno et al. | |
| 2012/0018646 A1* | 1/2012 | Takahashi | H04N 5/32 |
| | | | 250/371 |
| 2012/0229650 A1* | 9/2012 | Matthews | G06K 9/6289 |
| | | | 348/E5.085 |
| 2014/0204251 A1* | 7/2014 | Ishida | H04N 5/2351 |
| | | | 348/294 |
| 2015/0256760 A1* | 9/2015 | Ju | H04N 23/76 |
| | | | 348/256 |
| 2017/0134704 A1* | 5/2017 | Otsubo | G02B 5/208 |
| 2018/0332209 A1* | 11/2018 | Kojima | H04N 5/332 |
| 2020/0288072 A1* | 9/2020 | Seok | H04N 9/735 |

FOREIGN PATENT DOCUMENTS

| | | |
|---|---|---|
| CN | 107405093 A | 11/2017 |
| CN | 108600725 A | 9/2018 |
| CN | 108769502 A | 11/2018 |
| JP | 2014-165528 A | 9/2014 |

\* cited by examiner

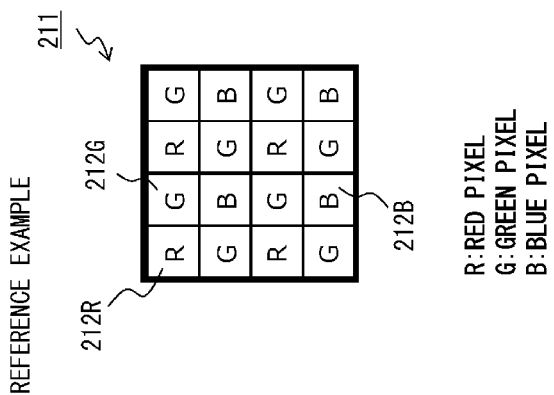
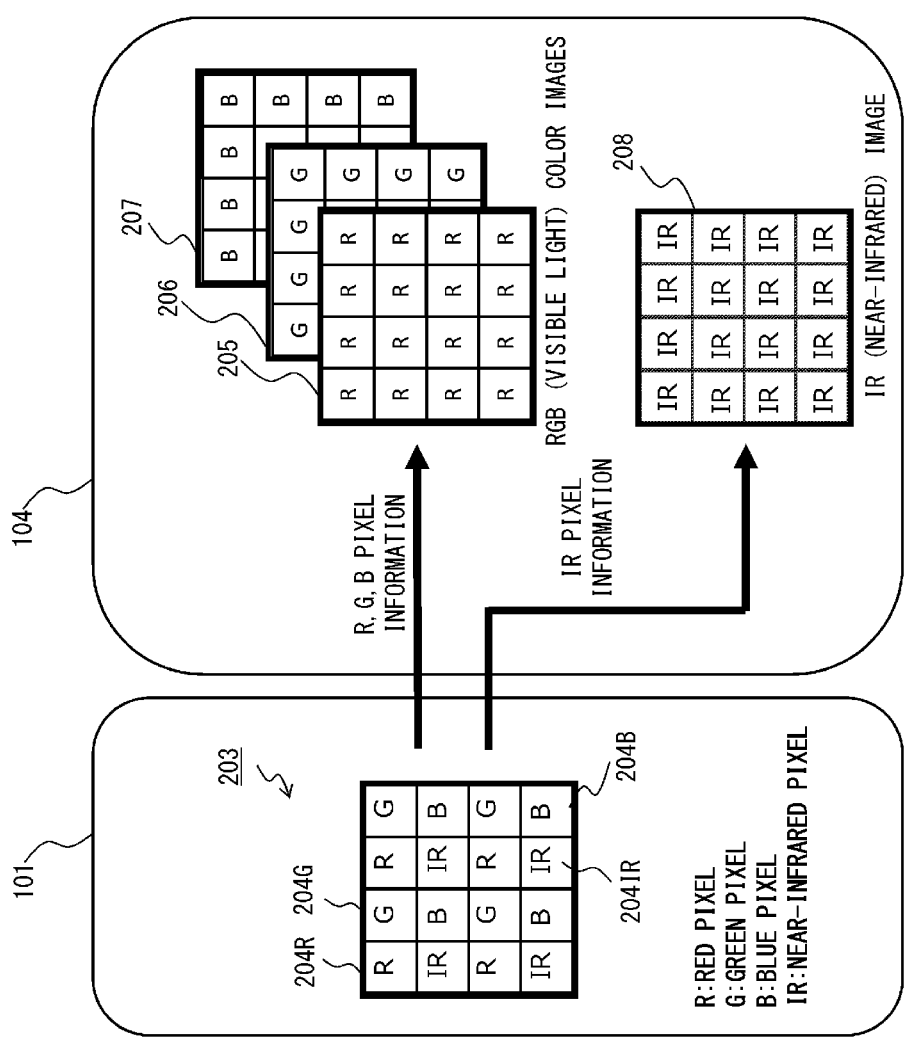

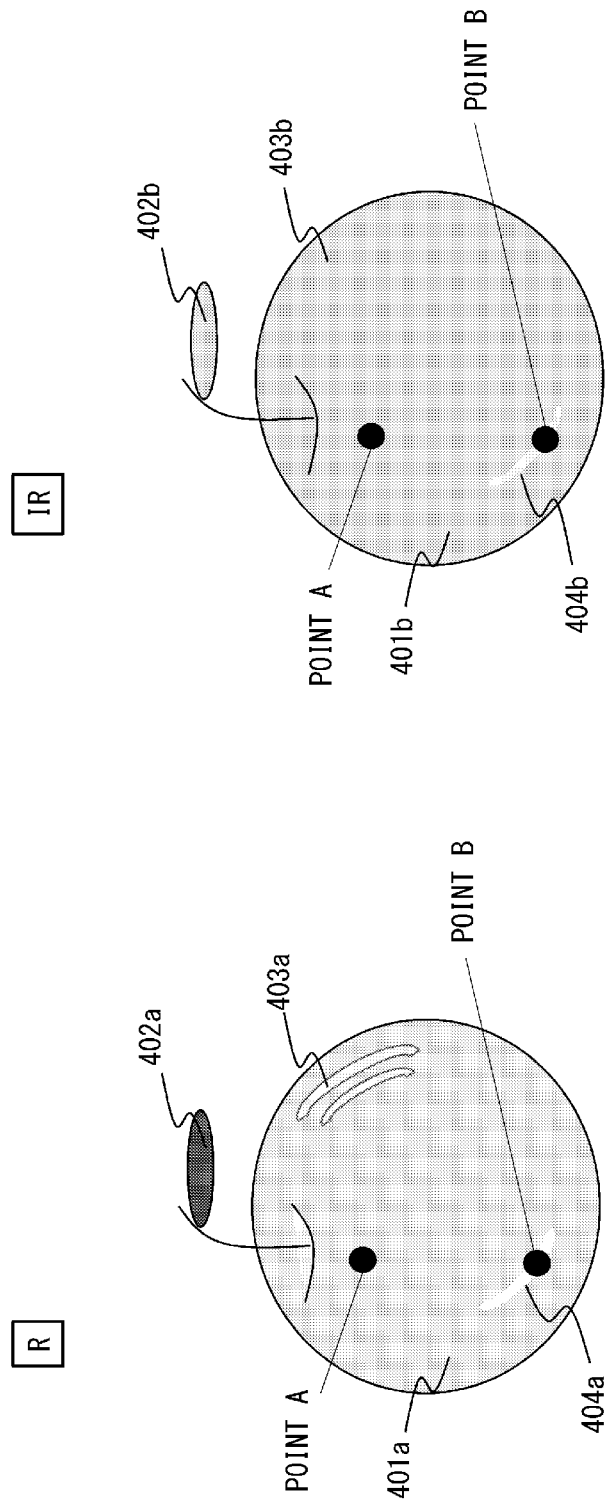

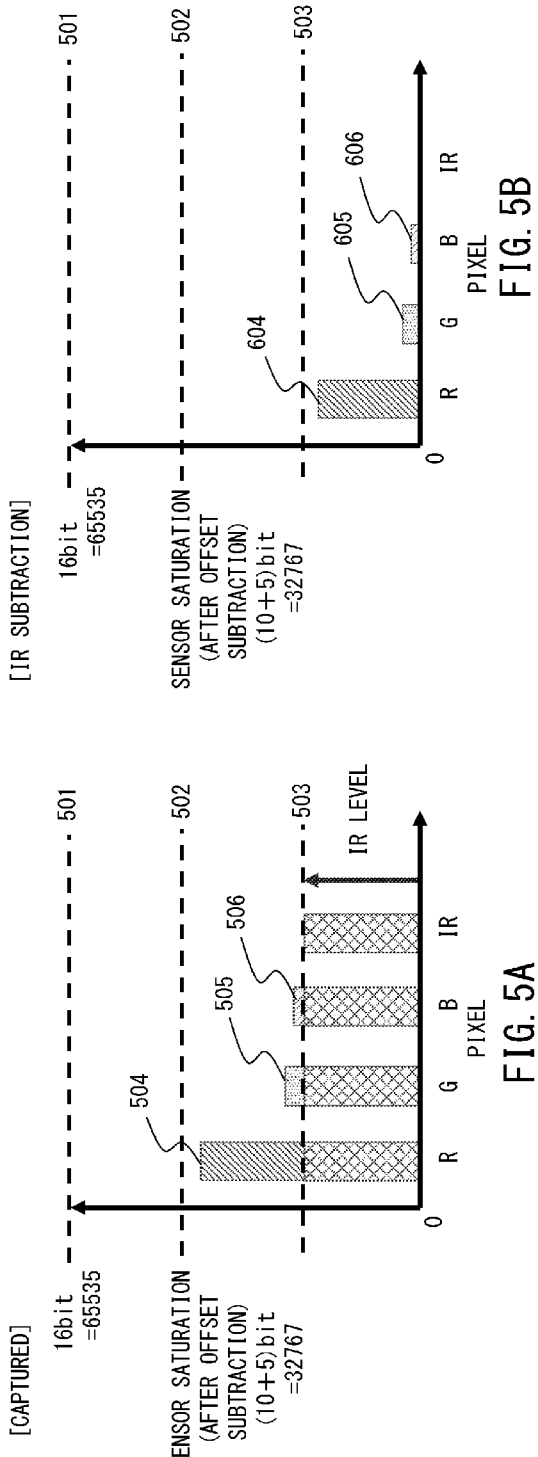

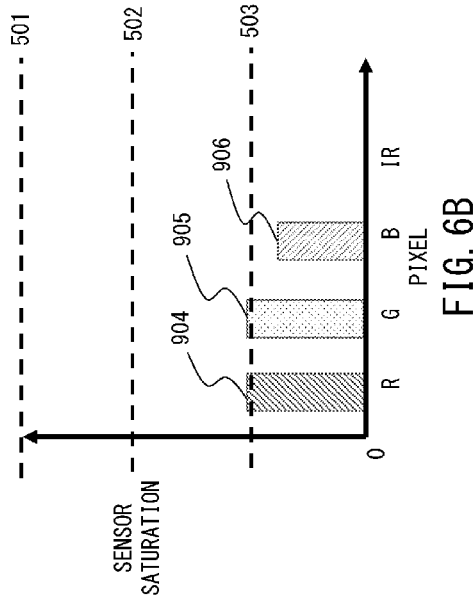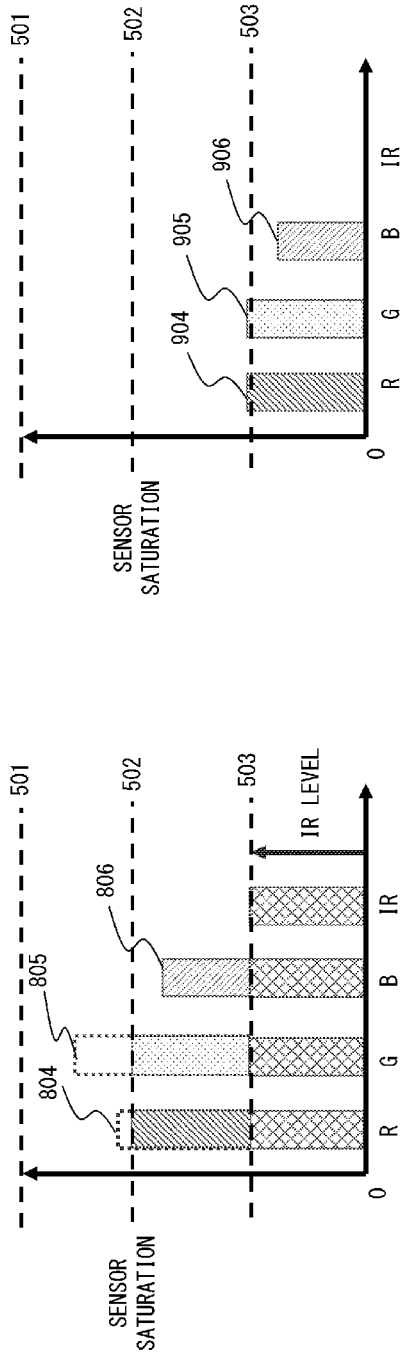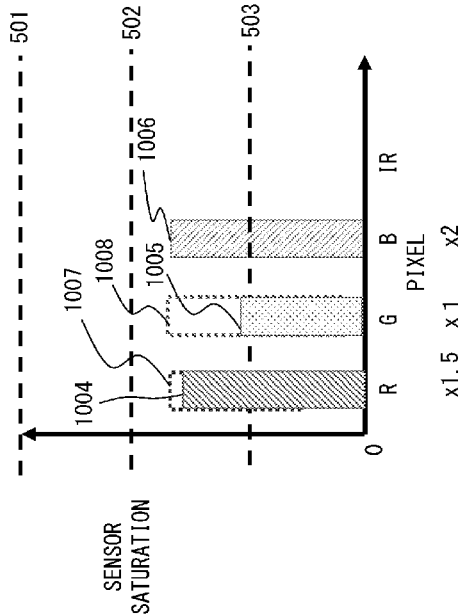

IMAGE PROCESSING APPARATUS, IMAGING APPARATUS, AND IMAGE PROCESSING METHOD

CROSS REFERENCE TO PRIORITY APPLICATION

This application claims the benefit of Japanese Patent Application No. 2020-040819, filed on Mar. 10, 2020, which is hereby incorporated by reference herein in its entirety.

BACKGROUND OF THE INVENTION

Field of the Invention

The present invention relates to an image processing apparatus, an imaging apparatus, and an image processing method.

Description of the Related Art

Recent years have seen increased use of near-infrared images captured by imagers sensitive to the near-infrared region. For example, irradiation of an intravenously injected fluorescent substance, such as indocyanine green, with near-infrared wavelength light enables blood vessels or lymph vessels to be visualized, and this is useful in medical applications and in-vivo observations. Also, determining an NDVI (Normalized Difference Vegetation Index), which is an indicator of the presence/absence or activities of vegetation, from the ratio of near-infrared wavelengths and infrared wavelengths of a captured image, is useful for growth observation or remote sensing of crops.

Imaging apparatuses capable of acquiring a near-infrared image and a visible light image at the same time have been developed. For example, an imaging apparatus is known, which is capable of simultaneously acquiring near-infrared image and visible light images by an imager having pixels, provided with a visible light color filter, and pixels, provided with a near-infrared color filter, with these pixels being arranged on the same plane.

Japanese Patent Application Laid-open No. 2014-165528 discloses an imaging apparatus capable of separating a near-infrared component from the output signals of visible light pixels by an imager having an array of pixels provided with an RGB color filter having an equal transmission rate to near-infrared light and a transparent filter.

Japanese Patent Application Laid-open No. 2014-165528 employs different color signal correction processes depending on whether pixels are saturated or not.

SUMMARY OF THE INVENTION

According to an aspect of the present disclosure, it is provided an image processing apparatus comprises at least one memory and at least one processor that which function as an input unit receiving an image signal of a visible light pixel and an image signal of a near-infrared pixel, output from a sensor including a visible light pixel and a near-infrared pixel, a determination unit determining whether or not an output signal of a near-infrared pixel is higher than a threshold, a detector detecting a saturated visible light pixel, and a switching unit switching over saturation processing to be applied to a saturated visible light pixel on the basis of a determination result of the determination unit.

According to another aspect of the present disclosure, an image processing method comprises: an input step of inputting an image signal of a visible light pixel and an image signal of a near-infrared pixel, output from a sensor including a visible light pixel and a near-infrared pixel, a determination step of determining whether or not an output signal of a near-infrared pixel is higher than a threshold, a detection step of detecting a saturated visible light pixel, and a switching step of switching over saturation processing to be applied to a saturated visible light pixel on the basis of a determination result at the determination step.

Further features of the present invention will become apparent from the following description of exemplary embodiments with reference to the attached drawings.

BRIEF DESCRIPTION OF THE DRAWINGS

FIG. 2A and FIG. 2B are illustrative diagrams of pixel components in an imaging unit.

FIG. 4A is an illustrative diagram of an image acquired in visible light, and FIG. 4B is an illustrative diagram of an image acquired in near-infrared.

FIGS. 5A to 5C are illustrative diagrams of white balance processing according to an existing technique.

FIGS. 6A to 6C are illustrative diagrams explaining a problem in saturation processing according to an existing technique.

DESCRIPTION OF THE EMBODIMENTS

The imaging apparatus of Japanese Patent Application Laid-open No. 2014-165528 determines whether or not a pixel is saturated based on a signal including an overlapping part of visible light and near-infrared components. When saturation occurs, it cannot be determined which of the visible light and the near-infrared is causing this saturation with this apparatus. The apparatus therefore entails a problem that false coloring occurs because correct colors cannot be reproduced by the corrected color signals.

An object of the present disclosure is to provide an image processing technique that enables acquisition of a high-quality image with less false coloring from an image containing saturated pixels.

After here the image processing apparatus of each embodiment will be described with reference to the drawings.

First Embodiment

Overall Configuration

Figure 1:
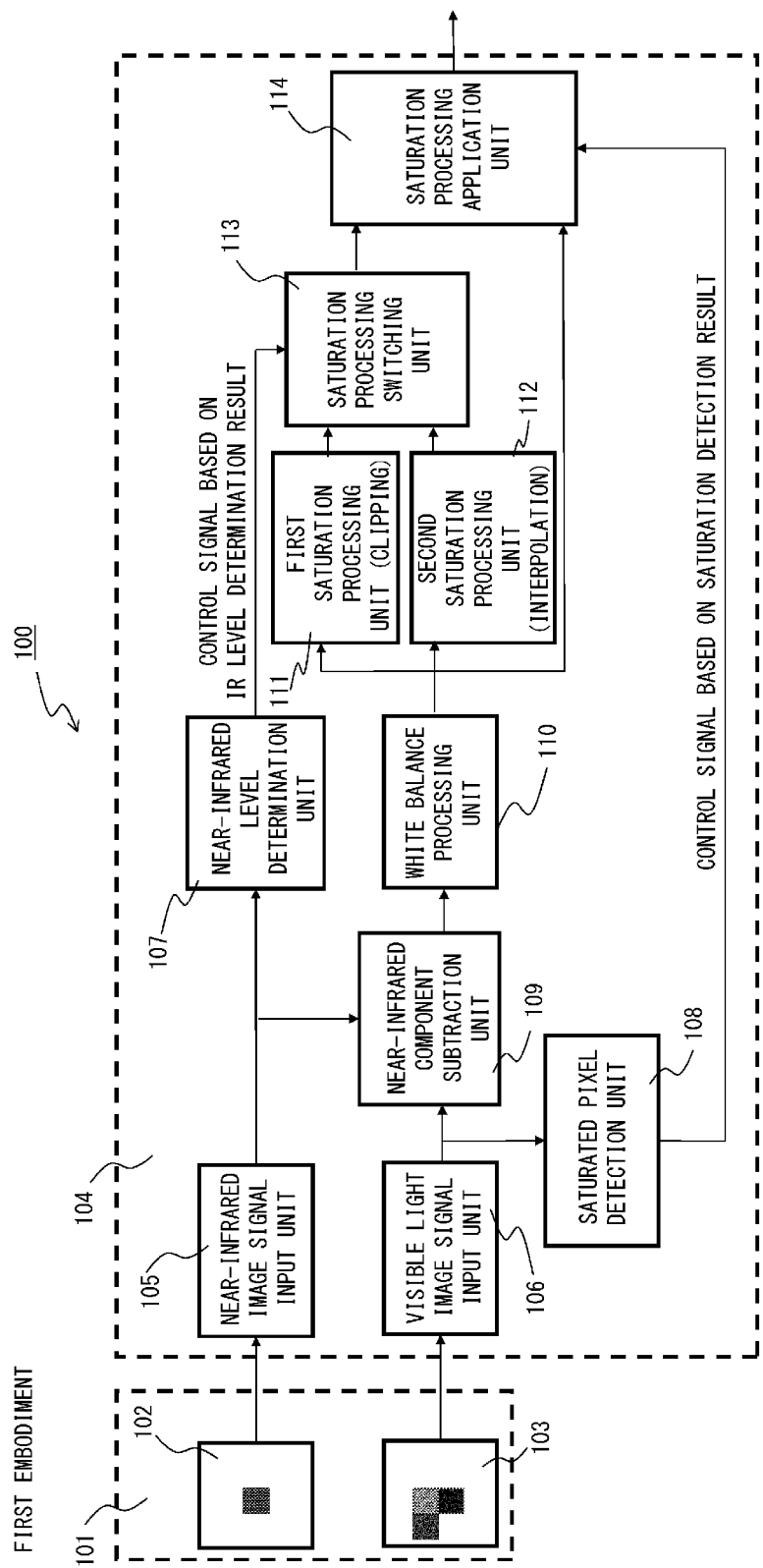
FIG. 1 is a block diagram of an image processing apparatus according to a first embodiment.

FIG. 1 is a diagram illustrating a configuration example of an image processing apparatus according to one embodiment of the present disclosure, wherein the image processing apparatus is provided with an imaging unit. The image processing apparatus of this embodiment may be understood also as an imaging apparatus. In other embodiments of the present disclosure, the image processing apparatus may be configured by an image processor alone, to which signals are input from a separate imaging unit.

The image processing apparatus 100 illustrated in FIG. 1 is configured by an imaging unit 101 and an image processor 104.

The imaging unit 101 includes a plurality of pixels. In this embodiment, the imaging unit 101 includes near-infrared pixel components 102 provided with a color filter most sensitive to near-infrared, and visible light pixel components 103 provided with a color filter most sensitive to visible light. As will be described later, the imaging unit 101 has a plurality of pixel groups of red, green, blue, and near-infrared pixels arrayed in two lines and two rows. While it is assumed here that the imager is a CMOS image sensor, it may also be a CCD image sensor. The visible light pixel components 103 here have a sensitivity to the near-infrared spectral range equal to that of the near-infrared pixel components 102.

The image processor 104 includes a near-infrared image signal input unit 105, a visible light image signal input unit 106, a near-infrared component subtraction unit 109, and a white balance processing unit 110. The image processor 104 further includes a near-infrared level determination unit 107, a saturated pixel detection unit 108, a first saturation processing unit 111, a second saturation processing unit 112, a saturation processing switching unit 113, and a saturation processing application unit 114, as functional units for saturation processing. These units may be realized by a dedicated hardware circuit such as an ASIC, or may be realized by a general-purpose processor such as a CPU executing a program.

The near-infrared image signal input unit 105 receives inputs of image signals from the near-infrared pixel components 102 of the imaging unit 101. The visible light image signal input unit 106 receives inputs of image signals from the visible light pixel components 103 of the imaging unit 101. After here, the image signals input to the input units 105 and 106 also shall be referred to as a near-infrared signal and a visible light signal, respectively.

The near-infrared level determination unit 107 determines the signal level of the near-infrared image. Specifically, the near-infrared level determination unit 107 determines whether or not the level of an output signal of each near-infrared pixel is higher than a level determination threshold. The determination results of the near-infrared level determination unit 107 are input to the saturation processing switching unit 113. The level determination threshold may be set such that if the near-infrared level is lower than the threshold, the saturation occurring in a visible light pixel can be attributed to a visible light component. For example, the level determination threshold may be the half value of the maximum output level (saturation level) of the imaging unit 101.

The saturated pixel detection unit 108 detects a saturated visible light pixel (saturated pixel) from the visible light image signal. The detection results of the saturated pixel detection unit 108 are input to the saturation processing application unit 114.

The near-infrared component subtraction unit 109 subtracts an output value of a near-infrared pixel near a visible light pixel from the output signal of this visible light pixel. By the subtraction process, visible light components of respective colors, i.e., red (R), green (G), and blue (B), from which the near-infrared component has been removed, are obtained. The near-infrared pixel near the visible light pixel may be, for example, a near-infrared pixel within the same pixel group as the visible light pixel. The near-infrared component subtraction unit 109 may subtract a value based on output values of a plurality of neighboring near-infrared pixels of the visible light pixel (e.g., an average value) from the output signal of the visible light pixel.

The white balance processing unit 110 processes the visible light signal after the subtraction of the near-infrared signal, adjusting the values of respective color components to achieve a color proportion that allows a white object to appear as natural white in accordance with the light source. Specifically, the white balance processing unit 110 performs white balance processing of multiplying the pixel value of each color contained in the image signal of the visible light pixel with a gain in accordance with the color. The gains for respective colors are predetermined.

The first saturation processing unit 111 applies first saturation processing to the visible light image signal after the white balance processing. The first saturation processing is a clipping operation, for example. Specifically, the first saturation processing unit 111 replaces the pixel values of saturated visible light pixels of respective colors with predetermined values. The predetermined values are white level values, and may be determined based on a pixel value of a visible light pixel of one color (e.g., green) within the same pixel group as the pixel being processed, or may be a preset value.

The second saturation processing unit 112 applies second saturation processing to the visible light image signal after the white balance processing. The second saturation processing is a process of determining the pixel value of a saturated visible light pixel based on pixel values of visible light pixels surrounding the saturated visible light pixel. A specific example of the second saturation processing is a process of replacing the pixel value of the saturated pixel with a pixel value obtained by interpolation of a plurality of visible light pixels surrounding the saturated visible light pixel. The replacement pixel value may be determined by referring only to unsaturated ones of the visible light pixels surrounding the saturated pixel.

The saturation processing switching unit 113 selects either the first saturation processing or the second saturation processing to be applied to a saturated visible light pixel based on the determination result of the near-infrared level determination unit 107. Specifically, the saturation processing switching unit 113 selects the first saturation processing if the output signal of a near-infrared pixel near the saturated pixel is lower than the level determination threshold, and selects the second saturation processing if the output signal is higher than the level determination threshold.

The saturation processing application unit 114 applies the saturation processing selected by the saturation processing switching unit 113 to the saturated visible light pixel, while outputting the image signals of unsaturated visible light pixels as they are after the white balance processing. The output signals from the saturation processing application unit 114 are output to a further image processor, image output unit, image recording unit, display unit, etc., which are not shown, for downstream operations.

Imager

FIG. 2A and FIG. 2B are illustrative diagrams of image information input from the imaging unit 101 of the first embodiment.

FIG. 2B is a schematic diagram of a conventional (common) visible light color imager 211. The color imager 211 has pixels 212R, 212G, and 212B respectively provided with red (R), green (G), and blue (B) filters and arranged in the Bayer pattern.

FIG. 2A is a schematic diagram of an imager 203 capable of acquiring both image signals of visible light and near-infrared, and adoptable in this embodiment. The imager 203 includes pixels 20418 provided with a near-infrared filter in addition to the pixels 204R, 204G, and 204B respectively provided with red (R), green (G), and blue (B) filters.

The image signal of near-infrared is separated from image signals obtained by the imager 203, and subtracted from the image signals of visible light pixels, so that images 205, 206, and 207 composed solely of red (R), green (G), and blue (B) are generated. An image 208 composed solely of the near-infrared component is obtained from the near-infrared pixels 2041R.

The imager 203 includes a plurality of pixel groups of first visible light pixels 204R, second visible light pixels 204G, third visible light pixels 204B, and near-infrared pixels 2041R arrayed in two lines and two rows. The arrangement of each pixel in the pixel group may be other than the configuration shown in FIG. 2A. One pixel group may contain a plurality of pixels corresponding to the same color.

Figure 3:
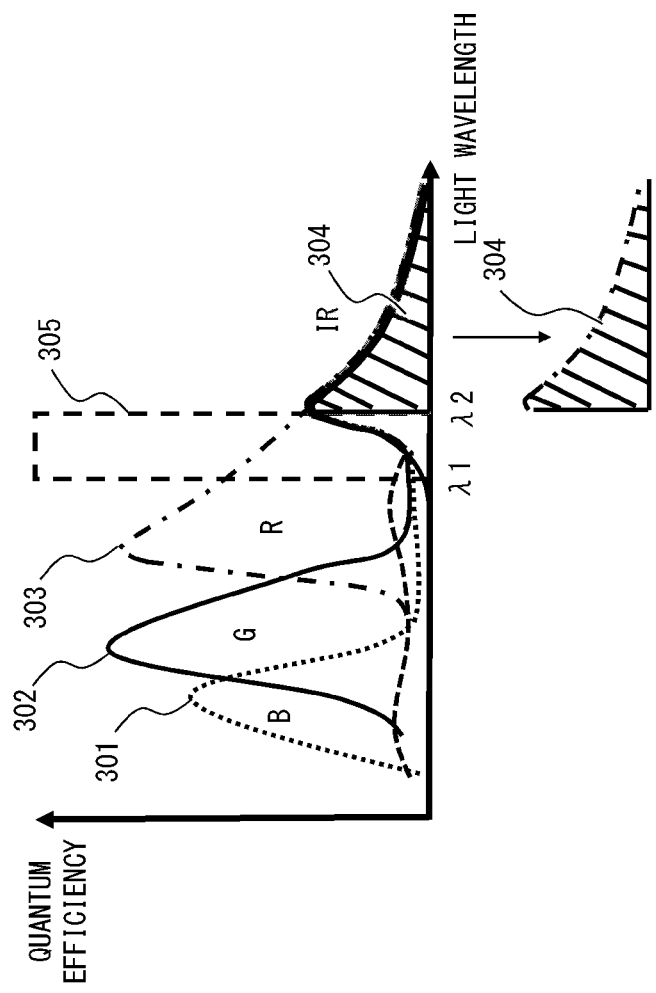
FIG. 3 is an illustrative diagram of characteristics of the imaging unit.

FIG. 3 shows a schematic diagram of quantum efficiencies (sensitivities) of respective pixels provided with visible light and near-infrared color filters. The curves 301, 302, 303, and 304 respectively represent the quantum efficiency (sensitivity) of the blue (B) pixel 204B, green (G) pixel 204G, red (R) pixel 204R, and near-infrared (IR) pixel 2041R.

Reference numeral 305 denotes a waveband removed by a band-cut filter inserted between the imager 203 and the lens. This band-cut filter removes the red to near-infrared bands. As shown in FIG. 3, the quantum efficiencies of red (R), green (G), and blue (B) pixels match in the near-infrared of at least a predetermined threshold $\lambda 2$. The band-cut filter removes the wavelengths in the near-infrared range where the quantum efficiencies of respective color pixels differ so that these wavelengths do not enter the visible light pixels and near-infrared pixels. Specifically, the band-cut filter removes the wavelengths in the range from $\lambda 1$ to the wavelength $\lambda 2$ mentioned above, $\lambda 1$ being the shortest wavelength of the sensitivity spectrum of near-infrared pixels. By adopting such a band-cut filter, the near-infrared component contained in visible light image signals of respective colors can be made equal to the near-infrared component 304 contained in the near-infrared image signal. Therefore, respective visible light components alone can be acquired by subtracting the near-infrared component 304 from the output signals from respective visible light pixels.

Influence of Pixel Saturation

The problem when saturation occurs in a visible light image is explained with reference to FIG. 4A to FIG. 6C. The explanation is given using an example in which an image of an apple was captured with the use of the imager 203 that includes the visible light pixels and near-infrared pixels as described with reference to FIG. 2A.

FIG. 4A shows an image acquired by red (R) pixels 204R of the visible light pixels. Since a fruit surface 401a of a red apple contains many red components, high output signals are obtained so that the image is bright. On the other hand, a green leaf part 402a contains few red components so that the output signals are low and the image is dark. In FIG. 4A and FIG. 4B, the shading of the drawings represents the magnitude of output signals, i.e., the whiter, the higher the pixel value (brighter), and the blacker, the lower the pixel value (darker).

FIG. 4B shows an image acquired by near-infrared pixels 20418. Since both the fruit surface 401b and green leaf part 402b reflect much of near-infrared, high output signals are obtained from both parts so that the image is bright.

When there is a visible light illumination source (not shown) on the upper right side of the object (apple), the illumination may create a light reflection spot 403a in the upper right on the apple surface of the visible light image in FIG. 4A where the pixels become saturated. If, however, the illumination light is from an LED source, or the like, and does not contain near-infrared, the influence of saturation caused by the visible light illumination does not appear at the spot 403b of the image acquired by near-infrared pixels in FIG. 4B.

On the other hand, when there is a near-infrared illumination source (not shown) located on the lower left side of the object (apple) for obtaining the near-infrared image, bright pixels due to the influence of the near-infrared illumination appear at a spot 404b in the lower left on the apple surface of the image acquired by near-infrared pixels in FIG. 4B. In addition, an influence 404a caused by the near-infrared component appears in the lower left on the apple surface of the visible light image, too, since visible light pixels also have sensitivity to near-infrared wavelengths. As described above, there are cases when a pixel does not become saturated by either one of near-infrared or visible light alone, but saturated by the combination of both of the near-infrared component and visible light components entering the visible light pixels.

S saturation processing under such circumstances is explained below with reference to FIG. 5A to FIG. 6C.

FIG. 5A is a schematic diagram showing the output levels of pixels corresponding to point A in FIG. 4A and FIG. 4B (unsaturated pixels) obtained from the pixels shown in FIG. 2. The horizontal axis represents red (R), green (G), blue (B), and near-infrared (IR) pixels, and the vertical axis represents the output signal levels of the pixel components. Reference numeral 501 in the drawings represents the full scale level of 16-bit signal processing (65535LSB), 502 represents the pixel saturation level of the imager, and 503 represents the output signal level of a near-infrared pixel near point A. Reference numerals 504, 505, and 506 represent the outputs of red (R), green (G), and blue (B) pixels, respectively. Since point A is on the fruit surface of the apple, the level of red component of visible light is high. As has been explained with reference to FIG. 3, the visible light image signals of red (R), green (G), and blue (B) each includes a near-infrared component overlapping each visible light component, and the near-infrared component of each color is often close to the amount of near-infrared component obtained by a neighboring near-infrared pixel.

FIG. 5B shows a schematic diagram of signal levels obtained by subtracting the near-infrared component of a neighboring near-infrared pixel from the respective signal components of pixels in FIG. 5A. Reference numerals 604, 605, and 606 represent values obtained by subtracting the near-infrared component 503 of a neighboring near-infrared pixel from the respective visible light image signals 504, 505, and 506 of red (R), green (G), and blue (B).

FIG. 5C shows a schematic diagram of signal levels after the white balance processing. In the example shown here, the signals of respective colors of FIG. 5B are multiplied with white balance coefficients such that red (R), green (G), and blue (B) are multiplied by 1.5 times, 1 time, and 2 times, respectively, in order to make white appear natural in accordance with the illumination used when the image was captured. Reference numerals 704, 705, and 706 represent values obtained by multiplying the visible light image signals 604, 605, and 606 of red (R), green (G), and blue (B) with the white balance coefficients, after the subtraction of the near-infrared component.

The color information is correctly retained for unsaturated pixels as shown in FIG. 5C. However, a problem arises when the same processing is performed for saturated pixels. This problem is explained below with reference to FIG. 6A to FIG. 6C.

FIG. 6A is a schematic diagram showing the output levels of pixels corresponding to point B in FIG. 4A and FIG. 4B (saturated pixels) obtained by the pixels shown in FIG. 2. The horizontal axis represents red (R), green (G), blue (B), and near-infrared (IR) pixels, and the vertical axis represents the output signal levels of the pixel components. Reference numeral 501 in the drawings represents the full scale level of 16-bit signal processing (65535LSB), 502 represents the pixel saturation level of the imager, and 503 represents the output signal level of a near-infrared pixel.

Reference numerals 804 and 805 represent expected outputs of red (R) and green (G) pixels, respectively, if the pixels are not saturated, and 806 represents the output of blue (B) pixel. Since the outputs 804 and 805 exceed the pixel saturation level 502, the actual output levels of red (R) and green (G) pixels become equal to the saturation level 502.

FIG. 6B is a schematic diagram similar to FIG. 5B of signal levels obtained by subtracting the near-infrared component of a neighboring near-infrared pixel from the respective signal components of pixels in FIG. 6A. Reference numerals 904, 905, and 906 represent values obtained by subtracting the near-infrared component 503 of the neighboring near-infrared pixel from the respective visible light image signals of red (R), green (G), and blue (B).

FIG. 6C shows a schematic diagram of signal levels after the white balance processing, similarly to FIG. 5C. The content of the white balance processing is the same as that described above. In the example shown here, the signals of respective colors of FIG. 6B are multiplied with white balance coefficients such that red (R), green (G), and blue (B) are multiplied by 1.5 times, 1 time, and 2 times, respectively. By multiplying the color signals 904, 905, and 906 by 1.5 times, 1 time, and 2 times, respectively, signals after the white balance processing denoted at 1004, 1005, and 1006 are obtained.

The dotted lines denoted at 1007 and 1008 represent expected outputs after the white balance processing corresponding to 804 and 805 of FIG. 6A if the pixels are not saturated.

As shown, the signal output that is supposed to have a color balance indicated by the outputs 1007, 1008, and 1006 in actuality come out with a different color balance indicated by outputs 1004, 1005, and 1006 because of the pixel saturation. In the case of the example shown in FIG. 6C, saturation results in a color close to purple instead of white that should appear if there is no saturation. As demonstrated above, saturation can cause false colors and color noises and deteriorate the image quality.

An object of this embodiment is to inhibit such false coloring and color noises resulting from pixel saturation, and to realize an image processing apparatus that allows for acquisition of favorable visible light images and near-infrared images.

Image Processing Operation

Figure 7:
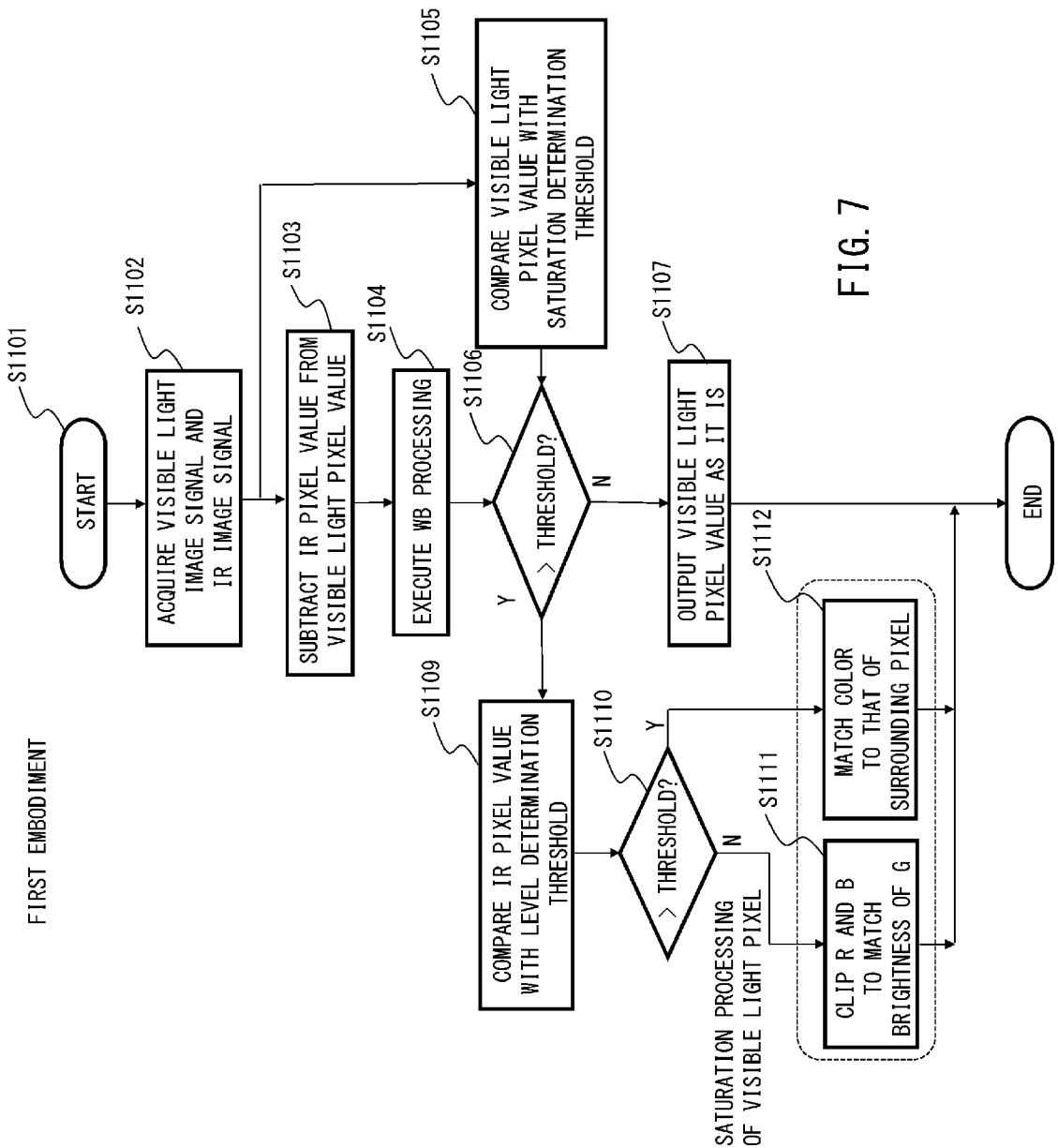
FIG. 7 is an illustrative diagram of a process flow according to the first embodiment.

The operation in the first embodiment is now described with reference to FIG. 1 and with the use of FIG. 7 to FIG. 9. FIG. 7 is a flowchart for generating color image signals from output signals of visible light pixels in the first embodiment. FIG. 8 and FIG. 9 are illustrative diagrams showing the signal levels, to be used for the explanation of the operation.

The flow for generating color image signals from output signals of visible light pixels starts at step S1101. This process can be started at any timing, for example, immediately after the imager 203 has obtained image signals of visible light pixels and near-infrared pixels.

At step S1102, the near-infrared image signal input unit 105 acquires a pixel signal value of a near-infrared pixel and the visible light image signal input unit 106 acquires pixel signal values of visible light pixels.

At step S1103, the near-infrared component subtraction unit 109 subtracts the pixel value of a neighboring near-infrared pixel from each pixel value of the visible light image signal. After that, at step S1104, the white balance processing unit 110 executes the white balance processing of multiplying the signal of each color with a white balance coefficient.

Meanwhile, at step S1105, the saturated pixel detection unit 108 compares the output signal of a visible light pixel before the subtraction of near-infrared with a saturation determination threshold to determine whether or not the pixel is saturated.

At step S1106, the processing is selected in accordance with whether or not the output value of the visible light pixel is greater than the saturation determination threshold. This selection of processing is determined for each pixel. If the output value of the visible light pixel is not more than the saturation determination threshold, i.e., if the pixel is not saturated (S1106: NO), the process goes to step S1107, where the saturation processing application unit 114 outputs the output signal of visible light pixel as it is after the white balance processing without applying the saturation processing.

On the other hand, if, at step S1106, the output value of the visible light pixel is greater than the saturation determination threshold, i.e., if the pixel is saturated (S1106: YES), the process goes to step S1110.

At step S1109, the near-infrared level determination unit 107 determines the level of the neighboring near-infrared image signal of the visible light pixel, i.e., compares it with a level determination threshold. A control signal based on the level determination result is input to the saturation processing switching unit 113.

At step S1110, the saturation processing switching unit 113 selects the saturation processing in accordance with the determination result at step S1109. The saturation processing switching unit 113 selects the first saturation processing (clipping) performed by the first saturation processing unit 111 if the IR pixel signal is at low level, i.e., not more than the level determination threshold. On the other hand, if the IR pixel signal is at high level, i.e., greater than the level determination threshold, the second saturation processing (interpolation) by the second saturation processing unit 112 is selected.

The first saturation processing (clipping) performed by the first saturation processing unit 111 at step S1111 is explained below. At step S1111, the first saturation processing unit 111 clips the R and B levels to the same level such as to match the pixel value of G in the visible light pixel signal to convert the color into white. When the level of near-infrared is low, it is likely that saturation is resulting from visible light, in which case clipping to the white level to delete the color is preferable.

Figure 8B:
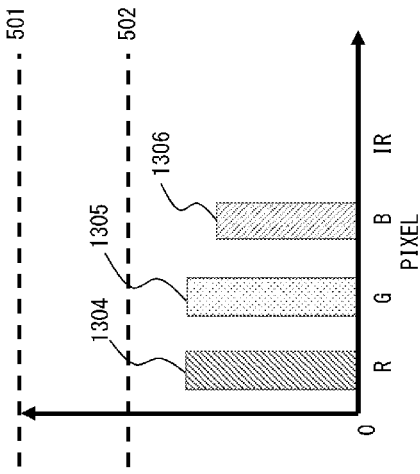
FIGS. 8A to 8C are illustrative diagrams of signal processing according to the first embodiment.
Figure 8A:
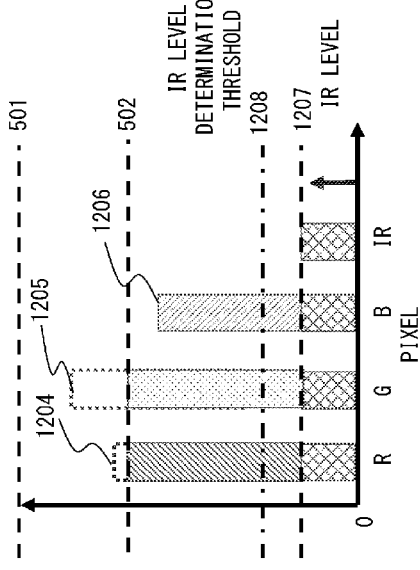

FIG. 8A is a schematic diagram showing levels of image signals obtained at step S1102 when, while saturation is occurring, the near-infrared level is not more than the threshold. The horizontal axis represents red (R), green (G), blue (B), and near-infrared (IR) pixels, and the vertical axis represents the output signal levels of the pixel components.

Reference numeral 1208 represents the level determination threshold for the determination of the near-infrared level. In the example of FIG. 8A, the output signal level 1207 of the near-infrared pixel is lower than this level determination threshold level 1208.

Reference numerals 1204 and 1205 represent expected outputs of red (R) and green (G) pixels, respectively, if the pixels are not saturated, and 1206 represents the output of the blue (B) pixel. Since the outputs 1204 and 1205 exceed the pixel saturation level 502, the actual output levels of red (R) and green (G) pixels become equal to the saturation level 502.

FIG. 8B is a schematic diagram of signal levels obtained by subtracting the near-infrared component of a neighboring near-infrared pixel from the signal components of respective pixels of FIG. 8A, i.e., after the processing at step S1103. Reference numerals 1304, 1305, and 1306 represent values obtained by subtracting the near-infrared component 1207 of the neighboring near-infrared pixel from the visible light image signals of respective colors of red (R), green (G), and blue (B).

Figure 8C:
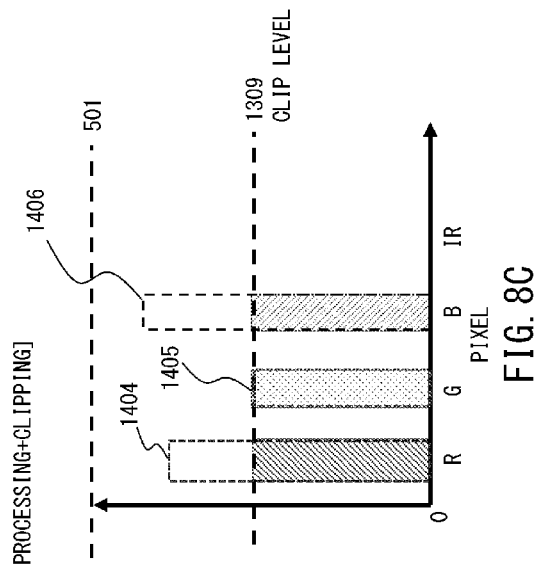

FIG. 8C shows a schematic diagram of signal levels after the white balance processing has been applied similarly to FIG. 6C and the signal levels after the clipping process. In the white balance processing at step S1104, the signals of respective colors, red (R), green (G), and blue (B) in FIG. 8B, are multiplied with white balance coefficients, for example, by 1.5 times, 1 time, and 2 times, respectively. Dotted lines denoted at 1404, 1405, and 1406 represent signal levels after the white balance processing. In this example, the white balance coefficient of green (G) is 1, so that the output 1305 is equal to output 1405.

The image after the white balance processing has a different color due to varied levels of color pixels. Since the outputs from the pixels are saturated, the original color information is lost, so that the color after the white balance processing is likely to be a false color. Since the near-infrared component of the pixel is lower than the threshold, it is unlikely that saturation is caused by a high intensity of near-infrared, i.e., it is likely that the saturation is caused by visible light. Therefore it can be determined that it is more appropriate to saturate this pixel by the clipping process to appear white rather than give this pixel a color. In the clipping operation (first saturation processing) at step S1111, as shown in FIG. 8C, green, which has the lowest signal level among the color signals of this pixel after the white balance processing is determined as the clip level 1309, and the signal levels of red and blue are clipped to this level.

As described above, in this embodiment, when there is pixel saturation (S1106: YES), and the level of near-infrared is low (S1110: NO), the clipping operation by the first saturation processing unit 111 is selected and applied. Thus, the target pixel is replaced with white image information without a color.

Next, the second saturation processing (interpolation) performed by the second saturation processing unit 112 at step S1112 is explained. The second saturation processing unit 112 generates an interpolation signal from pixels surrounding a saturated pixel, and replaces the signal of the saturated pixel therewith. This is because it is highly likely that saturation is occurring due to a near-infrared component, and that most of the pixel signals of original visible light is lost because of saturation. Pixels surrounding a saturated pixel may be defined as pixels within a predetermined distance (e.g., within three pixels) from the saturated pixel, or defined as a predetermined number of pixels from the saturated pixel.

Figure 9A:
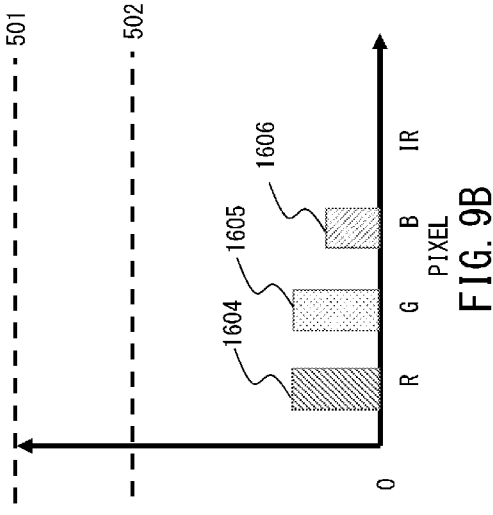
FIGS. 9A to 9C are illustrative diagrams of signal processing according to the first embodiment.

FIG. 9A is a schematic diagram showing levels of pixel signals obtained at step S1102 when saturation is occurring and the near-infrared level is greater than the threshold. The horizontal axis represents red (R), green (G), blue (B), and near-infrared (IR) pixels, and the vertical axis represents the output signal levels of the pixel components.

Reference numeral 1208 represents the level determination threshold for the determination of the near-infrared level. In the example of FIG. 9A, the output signal level 1507 of the near-infrared pixel is higher than this determination threshold level 1208.

Reference numerals 1504 and 1505 represent expected outputs of red (R) and green (G) pixels, respectively, if the pixels are not saturated, and 1506 represents the output of the blue (B) pixel. Since the outputs 1504 and 1505 exceed the pixel saturation level 502 of the imager, the actual output levels of red (R) and green (G) pixels become equal to the saturation level 502.

Figure 9B:
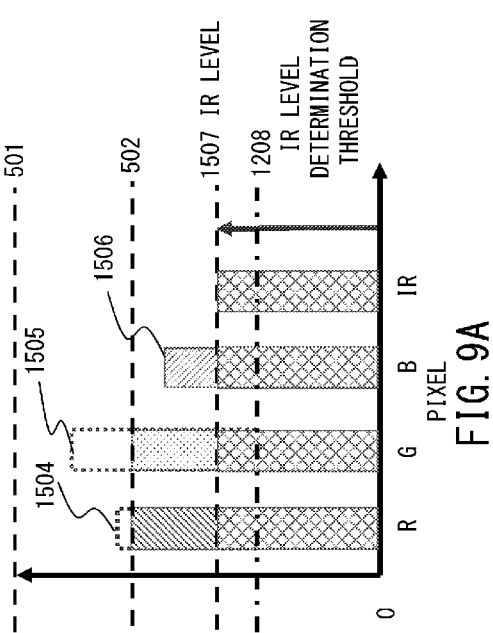

FIG. 9B is a schematic diagram of signal levels obtained by subtracting the near-infrared component of a neighboring near-infrared pixel from the signal components of respective pixels of FIG. 9A, i.e., after the processing at step S1103. Reference numerals 1604, 1605, and 1606 represent values obtained by subtracting the near-infrared component 1507 of the neighboring near-infrared pixel from the visible light image signals of respective colors of red (R), green (G), and blue (B).

Figure 9C:
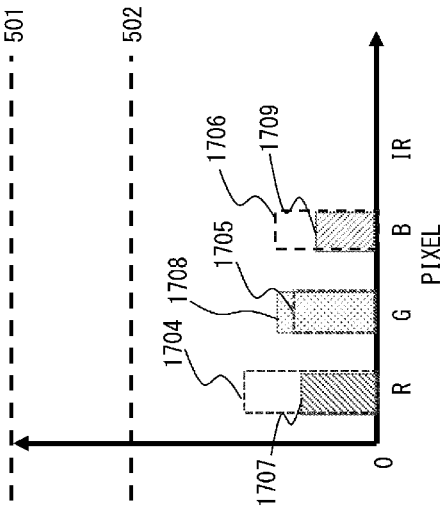

FIG. 9C shows a schematic diagram of signal levels after the white balance processing has been applied similarly to FIG. 6C and the signal levels after the interpolation. In the white balance processing at step S1104, the signals of respective colors, red (R), green (G), and blue (B) in FIG. 9B, are multiplied with white balance coefficients, for example, by 1.5 times, 1 time, and 2 times, respectively. Dotted lines denoted at 1704, 1705, and 1706 represent signal levels after the white balance processing. In this example, the white balance coefficient of green (G) is 1, so that the output 1605 is equal to output 1705.

The image after the white balance processing has a different color due to varied levels of color pixels. Since the outputs from the pixels are saturated, the original color information is lost, so that the color after the white balance processing is likely to be a false color. Since the near-infrared component of the pixel is higher than the threshold, it is likely that saturation is caused by a high intensity of near-infrared, and that the visible light information is mostly lost. It can therefore be determined that the color information of these pixel components should not be adopted. It is not appropriate either to saturate the pixel by the clipping process to appear white since the saturation is not being caused by a high intensity of visible light. In the interpolation process at step S1112 (second saturation processing), the color information of the pixel is replaced with color information obtained by interpolation of the information of a plurality of neighboring unsaturated pixels of the same color. Reference numerals 1707, 1708, and 1709 represent the corresponding image signals of red (R), green (G), and blue (B) pixels replaced by the interpolation process at step S1112.

As described above, in this embodiment, when there is pixel saturation (S1106: YES), and the level of near-infrared is high (S1110: YES), the interpolation process by the second saturation processing unit 112 is selected and applied. When the near-infrared component is higher than the threshold, it is likely that visible light is not causing the pixel saturation. Therefore, a more appropriate image signal can be obtained by using a color matching the surrounding color rather than deleting the color information by the clipping process to replace the color with white.

As described above, the saturation processing is selected in accordance with the level of near-infrared, to inhibit false coloring and to realize simultaneous acquisition of high-quality visible light image and near-infrared image.

Second Embodiment

Overall Configuration

Figure 10:
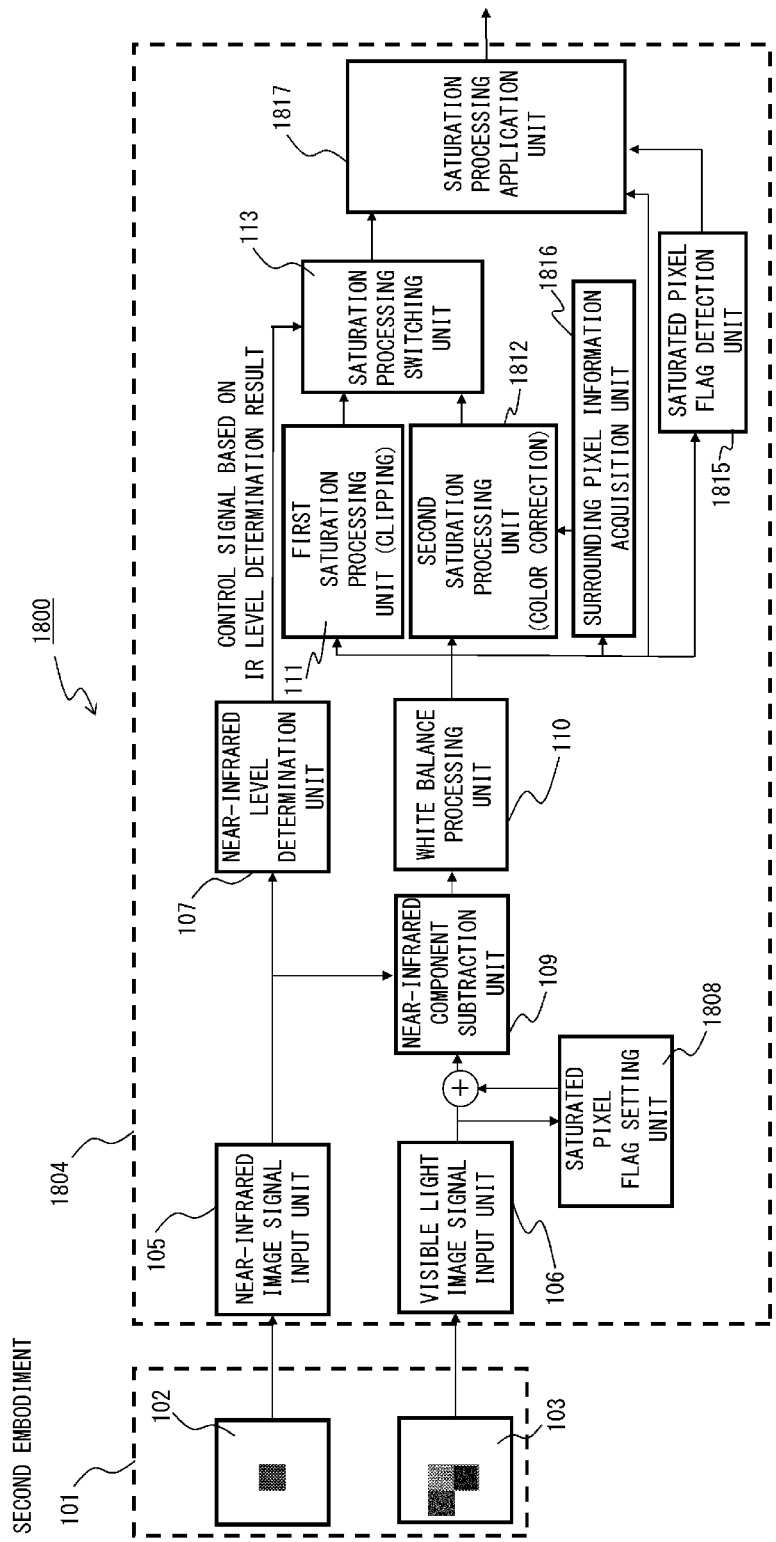
FIG. 10 is a block diagram of an image processing apparatus according to a second embodiment.

FIG. 10 illustrates a configuration example of an image processing apparatus 1800 according to a second embodiment. Similar to the first embodiment, the image processing apparatus 1800 is configured with an imaging unit 101 and an image processor 1804. In the following description, the elements similar to those of the first embodiment are given the same reference numerals and not described again.

The image processor 1804 is different from that of the first embodiment in that it includes a saturated pixel flag setting unit 1808 instead of the saturated pixel detection unit 108, and that it additionally includes a surrounding pixel information acquisition unit 1816 and a saturated pixel flag detection unit 1815. The processing contents of the second saturation processing unit 1812 and saturation processing application unit 1817 are also different from those of the second saturation processing unit 112 and the saturation processing application unit 114 in the first embodiment.

The saturated pixel flag setting unit 1808 carries out a process of detecting a saturated pixel from the visible light image signal input to the visible light image signal input unit 106, and, when it detects a saturated pixel, sets a saturation flag to the visible light image signal indicating that this pixel is saturated. The surrounding pixel information acquisition unit 1816 acquires color information from pixels surrounding a target pixel (saturated pixel), and outputs the same to the second saturation processing unit 1812. The second saturation processing unit 1812 will be described in detail later. The saturated pixel flag detection unit 1815 determines whether or not the target pixel is saturated based on the saturated pixel flag, and outputs the detection result to the saturation processing application unit 1817. If the pixel is saturated, the saturation processing application unit 1817 applies the saturation processing selected by the saturation processing switching unit 113, and, if the pixel is not saturated, outputs the pixel values of the visible light image as they are after the white balance processing.

Image Processing Operation

Figure 11:
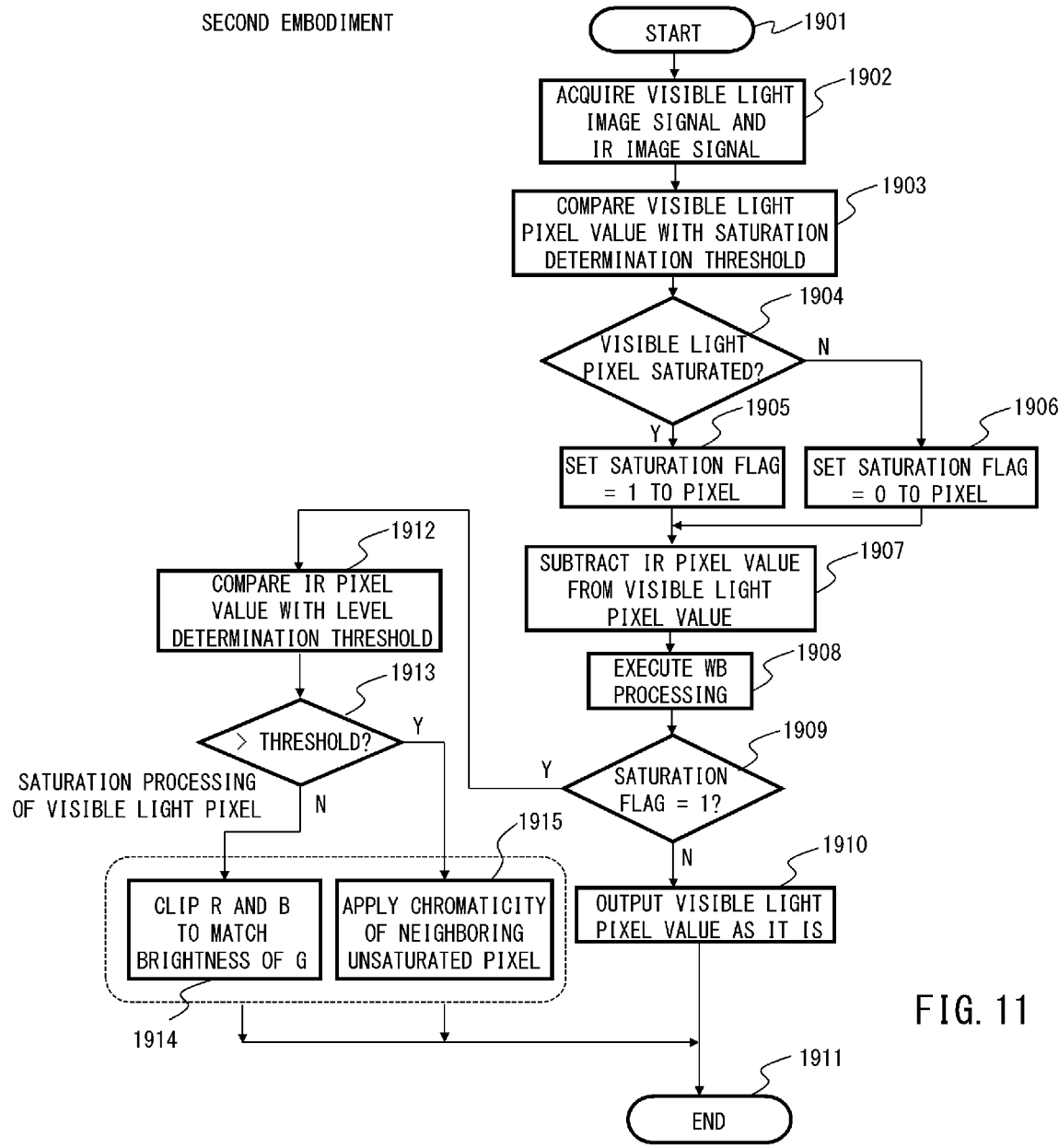
FIG. 11 is an illustrative diagram of signal processing according to the second embodiment.

The operation according to the second embodiment is described with reference to FIG. and FIG. 11. FIG. 11 is a flowchart for generating color image signals from output signals of visible light pixels in the second embodiment.

The flow for generating color image signals from output signals of visible light pixels starts at step S1901. This process can be started at any timing, for example, immediately after the imager 203 has obtained image signals of visible light pixels and near-infrared pixels.

At step S1902, the near-infrared image signal input unit 105 acquires a pixel signal value of a near-infrared pixel and the visible light image signal input unit 106 acquires pixel signal values of visible light pixels.

At step S1903, the saturated pixel flag setting unit 1808 compares the output signal of a visible light pixel before the subtraction of near-infrared with a saturation determination threshold to determine whether or not the pixel is saturated. If the output signal of the visible light pixel is higher than the saturation determination threshold, i.e., if it is determined that the pixel is saturated (S1904: YES), the process goes to step S1905, where the saturated pixel flag setting unit 1808 sets 1 as the saturation flag of this pixel. On the other hand, if the output signal of the visible light pixel is not more than the saturation determination threshold, i.e., if it is determined that the pixel is not saturated (S1904: NO), the process goes to step S1906, where the saturated pixel flag setting unit 1808 sets 0 as the saturation flag of this pixel. While 1 and 0 of the saturation flag respectively represent saturated and unsaturated here, any values can be set as the flag.

At step S1907, the near-infrared component subtraction unit 109 subtracts a near-infrared image signal obtained from a neighboring near-infrared pixel from each pixel value of the visible light image signal. After that, at step S1908, the white balance processing unit 110 executes the white balance processing of multiplying the signal of each color with a white balance coefficient.

At step S1909, the processing is selected in accordance with whether or not the saturation flag of the visible light pixel is 1, i.e., whether or not the visible light pixel is saturated. This selection of processing is determined for each pixel. If the saturation flag is 0, i.e., if the pixel is not saturated (S1909: NO), the process goes to step S1910, where the saturation processing application unit 114 outputs the output signal of the visible light pixel as it is after the white balance processing without applying the saturation processing.

On the other hand, if, at step S1909, the saturation flag is 1, i.e., if the pixel is saturated (S1909: YES), the process goes to step S1912. At step S1912, the near-infrared level determination unit 107 determines the level of near-infrared image signal of a neighboring near-infrared pixel of the visible light pixel, i.e., compares it with a level determination threshold. A control signal based on the level determination result is input to the saturation processing switching unit 113. At step S1913, the saturation processing switching unit 113 selects the saturation processing in accordance with the determination result at step S1912. The saturation processing switching unit 113 selects the first saturation processing (clipping) performed by the first saturation processing unit 111 if the IR pixel signal is at low level, i.e., not more than the determination threshold. On the other hand, if the IR pixel signal is at a high level, i.e., greater than the determination threshold, the second saturation processing (color interpolation) by the second saturation processing unit 1812 is selected.

The first saturation processing (clipping) performed by the first saturation processing unit 111 at step S1914 is the same as that of the first embodiment. Namely, the first saturation processing unit 111 clips the R and B levels to the same level such as to match the pixel value of G in the visible light pixel signal to convert the color into white.

The second saturation processing (color interpolation) performed by the second saturation processing unit 1812 at step S1915 is now explained. The second saturation processing unit 1812 detects the chromaticity of an unsaturated pixel around a target pixel (saturated pixel) acquired by the surrounding pixel information acquisition unit 1816 to generate correction information, and corrects the pixel values of the saturated pixel. The correction process can be a process of correcting pixel values of a saturated pixel to achieve the same chromaticity as that of surrounding unsaturated pixels. When the near-infrared component near the saturated pixel is at a high level, it is likely that saturation is caused by the near-infrared component. In this case, it is more appropriate to correct the color in accordance with the color information of surrounding unsaturated pixels rather than saturating the pixel by the clipping process to make it appear white.

As described above, the saturation processing is selected in accordance with the level of near-infrared, to inhibit false coloring and to realize simultaneous acquisition of high-quality visible light image and near-infrared image.

This embodiment is different from the first embodiment mainly in the content of the second saturation processing and in the method of transmitting the detection result of the saturated pixel to the saturation processing application unit 114. These modifications need not be applied to the first embodiment in this combination. One of these processes may be the same as that of the first embodiment.

Other Embodiments

The contents of saturation processing to be applied are not limited to the processes described in the first and second embodiments. The second saturation processing that is applied when the level of near-infrared is high may be other than the process described above, as long as the process determines the pixel values of a saturated pixel based on pixel values of a neighboring pixel of the saturated pixel. For example, the color information of a saturated pixel may be estimated from pixel values of pixels surrounding the saturated pixel using a preconfigured database and replaced with this estimated color information. Alternatively, the color information of a saturated pixel may be replaced with color information obtained by inputting pixel values of pixels surrounding the saturated pixel in a machine learning model designed to estimate color information of the center pixel from the pixel values of the surrounding pixels.

While an output signal of an infrared pixel is subtracted from output signals of visible light pixels using the near-infrared component subtraction unit 109 in the embodiments described above, this process may be omitted. In this case, too, false coloring can be inhibited by switching over the saturation processing in accordance with which of the near-infrared component and visible light component is causing saturation.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

The present disclosure allows acquisition of a high-quality image with less false coloring from an image containing saturated pixels.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
one or more processors; and
at least one memory storing instructions that, when executed by the one or more processors, causes the image processing apparatus to function as:
an input unit configured to receive an image signal, of a visible light pixel and an image signal of a near-infrared pixel, output from a sensor that includes a plurality of groups including a first visible light pixel component, a second visible light pixel component, a third visible light pixel component, and a near-infrared pixel component;
a determination unit configured to determine whether or not an output signal of the near-infrared pixel is higher than a threshold and to produce a determination result;
a detector configured to detect a saturated visible light pixel, an output value from which is higher than a saturation threshold; and
a switching unit configured to switch over saturation processing to be applied to the saturated visible light pixel on the basis of the determination result of the determination unit, wherein the switching unit is further configured:
to select, when the output signal of the near-infrared pixel is lower than the threshold, first saturation processing in which a pixel value of the saturated visible light pixel of each color is replaced with a predetermined value, and
to select, when the output signal of the near-infrared pixel is higher than the threshold, second saturation processing in which a pixel value of each visible light pixel included in one of the plurality of groups, including the saturated visible light pixel is determined based on a pixel value of each unsaturated visible light pixel of another group in the vicinity of one of the plurality of groups.

2. The image processing apparatus according to claim 1, wherein the first saturation processing is processing of replacing the pixel value of the saturated visible light pixel with a pixel value of one of visible light pixels within a same group, with the pixel values being the same.

3. The image processing apparatus according to claim 2, wherein the second saturation processing is processing of replacing the pixel value of the saturated visible light pixel with a pixel value obtained by interpolation of a plurality of visible light pixels in the vicinity of the saturated visible light pixel.

4. The image processing apparatus according to claim 2, wherein the second saturation processing is processing of correcting the pixel value of the saturated visible light pixel on the basis of color information of the visible light pixel in the vicinity of the saturated visible light pixel.

5. The image processing apparatus according to claim 4, wherein the second saturation processing is processing of correcting the pixel value of the saturated visible light pixel to obtain a same chromaticity as a chromaticity of the visible light pixel in the vicinity thereof.

6. The image processing apparatus according to claim 1, wherein the one or more processors and the at least one memory further function as:
   a white balance processing unit configured to perform white balance processing of multiplying a pixel value of the image signal of the visible light pixel with a gain in accordance with a color; and
   a saturation processing application unit configured to apply saturation processing selected by the switching unit to the image signal after the white balance processing.

7. The image processing apparatus according to claim 6, wherein the saturation processing application unit is further configured to apply the saturation processing selected by the switching unit to the saturated visible light pixel, while outputting, without modification, an image signal after the white balance processing.

8. The image processing apparatus according to claim 7, wherein a detection result of the detector is input to the saturation processing application unit, and
   the saturation processing application unit is further configured to determine whether or not saturation processing is to be applied to the visible light pixel on the basis of the detection result.

9. The image processing apparatus according to claim 7, wherein the detector is configured to add information indicative of whether or not a visible light pixel is saturated to the image signal of the visible light pixel, and
   the saturation processing application unit is further configured to determine whether or not saturation processing is to be applied to the visible light pixel on the basis of the information added to the image signal of the visible light pixel.

10. The image processing apparatus according to claim 6, wherein the one or more processors and the at least one memory further function as:
    a subtraction unit configured to subtract an output value of a near-infrared pixel in the vicinity of the visible light pixel from the output signal of the visible light pixel, wherein the white balance processing is performed on the output signal of the visible light pixel from which the output value of the near-infrared pixel has been subtracted.

11. An imaging apparatus comprising:
    the image processing apparatus according to claim 1; and
    the sensor that outputs the image signal that includes the visible light pixel components and the near-infrared pixel component.

12. The imaging apparatus according to claim 11, wherein the visible light pixel components and the near-infrared pixel component are arranged on a same plane in the sensor.

13. The imaging apparatus according to claim 11, further comprising a band-cut filter configured to remove a wavelength band, in which the visible light pixel components and the near-infrared pixel component have different sensitivities, of a near-infrared range from light incident on the sensor.

14. An image processing method comprising:
    an input step of inputting an image signal of a visible light pixel and an image signal of a near-infrared pixel, output from a sensor that includes a plurality of groups including a first visible light pixel component, a second visible light pixel component, a third visible light pixel component, and a near-infrared pixel component;
    a determination step of determining whether or not an output signal of the near-infrared pixel is higher than a threshold and producing a determination result;
    a detection step of detecting a saturated visible light pixel, an output value from which is higher than a saturation threshold; and
    a switching step of switching over saturation processing to be applied to the saturated visible light pixel on the basis of the determination result at the determination step, wherein the switching step is further configured:
       to select, when the output signal of the near-infrared pixel is lower than the threshold, first saturation processing in which a pixel value of the saturated visible light pixel of each color is replaced with a predetermined value, and
       to select, when the output signal of the near-infrared pixel is higher than the threshold, second saturation processing in which a pixel value of each visible light pixel included in one of the plurality of groups including the saturated visible light pixel is determined based on a pixel value of each unsaturated visible light pixel of another group in the vicinity of one of the plurality of groups.

15. A non-transitory computer readable medium that stores a program, wherein the program causes a computer to execute:
    an input step of inputting an image signal of a visible light pixel and an image signal of a near-infrared pixel, output from a sensor that includes a plurality of groups including a first visible light pixel component, a second visible light pixel component, a third visible light pixel component, and a near-infrared pixel component;
    a determination step of determining whether or not an output signal of the near-infrared pixel is higher than a threshold;
    a detection step of detecting a saturated visible light pixel, an output value from which is higher than a saturation threshold; and
    a switching step of switching over saturation processing to be applied to the saturated visible light pixel on the basis of the determination result at the determination step, wherein the switching step is further configured:
       to select, when the output signal of the near-infrared pixel is lower than the threshold, first saturation processing in which a pixel value of the saturated visible light pixel of each color is replaced with a predetermined value, and
       to select, when the output signal of the near-infrared pixel is higher than the threshold, second saturation processing in which a pixel value of each visible light pixel included in one of the plurality of groups including the saturated visible light pixel is determined based on a pixel value of each unsaturated visible light pixel of another group in the vicinity of one of the plurality of groups.

16. The image processing apparatus according to claim 1, wherein the threshold is a half value of a maximum output level of the sensor.

17. The image processing apparatus according to claim 1, wherein the threshold is such a value that if the near-infrared level is lower than the threshold, saturation occurring in a visible light pixel is attributed to a visible light component.

\* \* \* \* \*